UNITED STATES PATENT OFFICE.

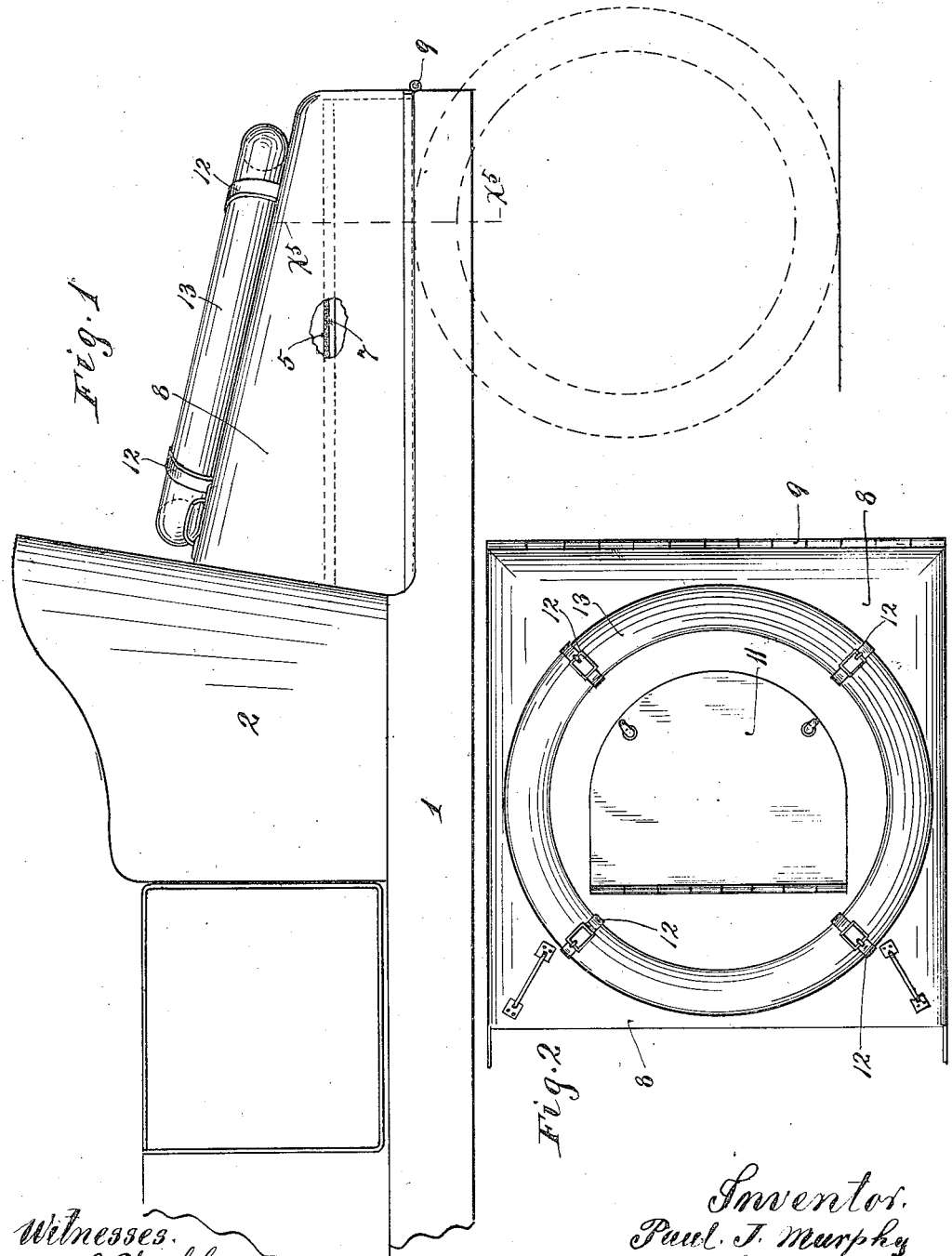

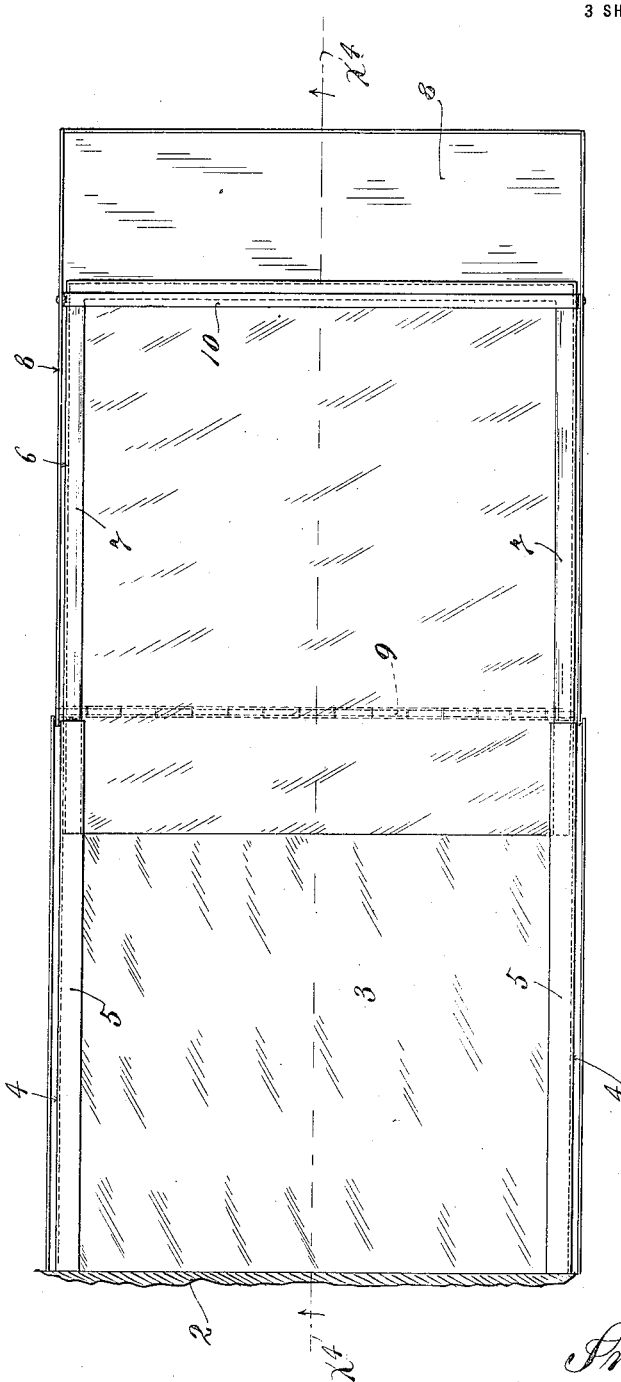

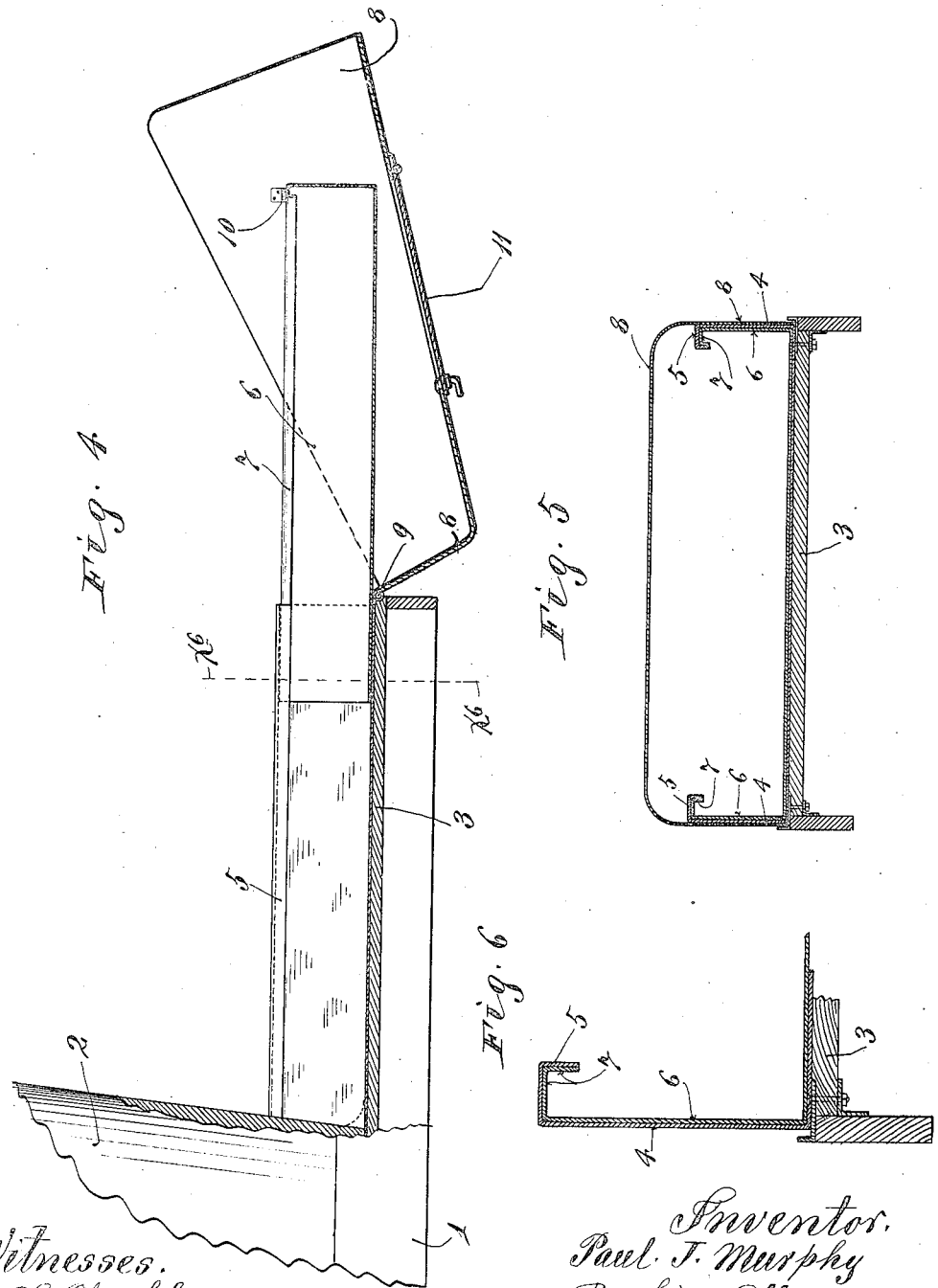

PAUL J. MURPHY, OF MINNEAPOLIS, MINNESOTA.

AUTOMOBILE-BODY.

1,150,954.      Specification of Letters Patent.     Patented Aug. 24, 1915.

Application filed July 16, 1914. Serial No. 851,292.

*To all whom it may concern:*

Be it known that I, PAUL J. MURPHY, a citizen of the United States, residing at Minneapolis, in the county of Hennepin and State of Minnesota, have invented certain new and useful Improvements in Automobile-Bodies; and I do hereby declare the following to be a full, clear, and exact description of the invention, such as will enable others skilled in the art to which it appertains to make and use the same.

My invention relates to automobile bodies and has for its object to provide a simple and efficient extensible box or carrying compartment therefor.

In the well known Ford runabout, and in other one seat automobiles, it is the common practice to provide a so-called torpedo body or box which is extended rearward of the single seat and adapted for use in carrying small articles. Such rear end box or extension is customarily provided with a hood having a door in its top affording access to the interior thereof, but such boxes are not adapted for use to carry anything of large size. My invention so modifies and improves the above noted type of box or torpedo body that it is adapted to be opened up and extended and used for carrying various things of large sizes, but which, when folded or closed, has approximately the ordinary appearance and is then adapted for use to carry smaller articles within its closed compartment.

In the accompanying drawings which illustrate the invention, like characters indicate like parts throughout the several views.

Referring to the drawings: Figure 1 is a side elevation with some parts removed and some parts indicated in diagram only, showing an automobile body such as used on the Ford runabout, but having my invention applied thereto; Fig. 2 is a view showing only the torpedo extension or box; Fig. 3 is a plan view showing the extensible box or torpedo body opened up and extended; Fig. 4 is a vertical section taken on the line $x^4$ $x^4$ on Fig. 3; Fig. 5 is a transverse section taken on the line $x^5$ $x^5$ on Fig. 1, some parts being removed; and Fig. 6 is a section taken on the line $x^6$ $x^6$ on Fig. 4, some parts being broken away.

The numeral 1 indicates the base frame of the automobile body and the numeral 2 indicates the seat thereof. That portion of the frame 1 which extends at the rear of the seat 2 is provided with a bottom forming board or plate 3 and with laterally spaced side boards 4 having inward and downward guide channels 5 at their upper edges. The board 3 and sides 4 constitute the fixed portion of the carrying box.

The numeral 6 indicates a supplemental box, preferably constructed of sheet metal and which consists of a bottom, sides and rear end, but is open at its front end. This supplemental box is mounted to slide telescopically into and out of the fixed or main box, and the upper edges of its sides are preferably turned inward and downward to afford flanges 7 that work within the guide flanges 5 of said fixed or main box. Normally, the supplemental box will be telescoped completely into the main box, so that its outer end wall affords an outer end wall to the said main box.

The numeral 8 indicates a large hood that is hinged at 9 to the outer extremity of the bottom 3 of the main box. This hood is made up of top, rear end and sides and normally occupies the position shown in Figs. 1 and 2, in which its flanges completely embrace the sides of the main and supplemental boxes and the top completely covers the same, thereby affording a closed carrying compartment much like that employed on the Ford runabout, but preferably of somewhat greater carrying capacity, even when closed. The hood 8 has a transverse metal cross bar 10 that rigidly connects the sides thereof, but performs a more or less important function, presently to be noted. The top plate of the hood 8 is preferably provided with a hinged door 11 which affords access to the interior of the inclosed carrying compartment while the hood is in its normal closed position. Also, as shown, and preferred, the hood, on its top plate, is provided with a plurality of tire securing devices, such as buckle-equipped straps 12, and which are adapted to hold an extra tire 13 on top of the hood.

When it is desired to carry large articles on the rear of the machine, the hood 8 is turned backward and upside-down, and the supplemental box 6 is drawn out of the main box approximately as shown in Figs. 3 and 4, and until its outer end portion is carried under the cross bar 10 of the said hood. When the said cross bar 10 thus rests upon the extended end of the supplemental box, the hood is very securely supported in its inverted position and its weight will hold the supplemental box against accidental sliding movements.

Obviously, the box extension as shown in Figs. 3 and 4, will carry a very good size load. In fact, both the strength and durability and efficiency of this extensible box have been thoroughly demonstrated in actual practice. Not only can the extensible box proper be utilized to carry articles of large size and very considerable weight, but other articles may even be placed in the inverted hood below the extended supplemental box. The extensible box is of simple construction and small cost and provides means for converting what appears to be an automobile of the ordinary runabout type into an automobile of very considerable carrying capacity, well adapted for use as a light delivery wagon. Furthermore, it may be very easily and quickly converted from the one form into the other.

What I claim is:

1. The combination with a vehicle having a main carrying box, of a supplemental carrying box connected to said main box for horizontal sliding movements, but held against vertical movements in respect thereto, a hood hinged at the rear portion of said main box, normally covering the said main and supplemental boxes and arranged to be turned rearward to permit the rearward extension of said supplemental box, and means for supporting said hood in its back-turned position with the said supplemental box extended.

2. The combination with a vehicle having a main carrying box, of a supplemental carrying box connected to said main box for horizontal sliding movements, but held against vertical movements in respect thereto, a hood hinged at the rear portion of said main box, normally covering the said main and supplemental boxes and arranged to be turned rearward to permit the rearward extension of said supplemental box, the said hood and box having engaging parts for supporting the said hood in a back-turned position from the rearwardly extended portion of said supplemental box.

3. The combination with a vehicle having a main carrying box, of a supplemental carrying box connected to said main box for horizontal sliding movements, but held against vertical movements in respect thereto, a hood hinged at the rear portion of said main box, normally covering the said main and supplemental boxes and arranged to be turned rearward to permit the rearward extension of said supplemental box, the said supplemental box having an open top and open front end, and the said hood having a transverse bar adapted to engage the extended portion of said supplemental box to support said hood therefrom in a back-turned position.

4. The combination with a vehicle body having a seat and a main carrying box at the rear of said seat, of a supplemental carrying box connected to said main box for horizontal sliding movements but held against vertical movements in respect thereto, and a hood hinged at the rear portion of said main box normally covering said main and supplemental boxes and arranged to be turned rearward to permit the rearward extension of said supplemental box, the said supplemental box and hood having engaging parts for supporting said hood in a back-turned position from the extended rear end portion of said supplemental box.

In testimony whereof I affix my signature in presence of two witnesses:

PAUL J. MURPHY.

Witnesses:
ALICE L. KING,
HARRY D. KILGORE.